Patented May 12, 1942

2,282,786

UNITED STATES PATENT OFFICE 2,282,786

STABILIZATION OF ANIMAL MEALS

Sidney Musher, New York, N. Y., assignor to Musher Foundation Incorporated, New York, N. Y., a corporation of New York No Drawing. Application April 23, 1940, Serial No. 331,179

7 Claims. (Cl. 99—169)

This application relates to retarding protein and fat deterioration of substantially dehydrated fish meals and similar finely divided meat and fish meals.

In the manufacture of fish meal, for example, regardless of whether small or large proportions of fat are present, protein as well as fat decomposition readily takes place resulting in loss of nutritive value and loss of digestibility as well as loss in vitamin A content and biological or feed value.

It has now been found that when a major amount of molasses is added to and combined with fishery and similar high protein containing animal products, not only is the fat or oil present highly stabilized against oxidative deterioration but furthermore the protein is rendered much more stable and retains its original biological value over much longer periods of time.

Although the present invention also has application to fish meal and similar meat and fish meals which may be left after removal of substantially all of the oil or fat portion contained therein, it is particularly directed to the stabilization of such products containing a large part or substantially all of the original oil or fat present in the original meat or fish product.

This invention also has specific application to the stabilization of meat and fish products which are normally low in oil and in which the principal deterioration is that of destruction of vitamin A as well as reduction in protein biological value as a result of storage and when in contact with minerals including copper, iron and manganese, for example, with which such meat and fish residues may be admixed.

It is found that the most important stabilization is obtained where there is a heat treatment after or incidental to the removal of substantially all of the water present and the product which is stabilized against fat and protein decomposition should always be reduced to a moisture content of less than about 15% and preferably less than 10% after or incidental to the addition of the molasses thereto.

The preferred application of the present invention resides in the dispersion of fish meal in a major amount of blackstrap molasses.

The blackstrap molasses utilized in accordance with this invention is the uncrystallized residue remaining following the crystallization of sugar, preferably cane sugar, and after removal of the sucrose crystals by centrifugal filtration. The uncrystallized sugar residue may, where desired, be added back to another lot of sugar in the process of crystallization and, after such separations, the final uncrystallized product may be utilized as the blackstrap molasses of the present invention.

Of particular importance in the present invention is the treatment of fishery products such as the preparation of substantially dehydrated, high fat-containing herring, mackerel, salmon, menhaden, sardine or tuna fish meals and also in the preparation of the relatively low fat-containing cod, halibut and similar meals.

In the preparation of these fishery and meat products, where part or all may consist of the heads, tails, entrails and other residues, they may be subjected to a preliminary boiling or digestion process in order to break up the individual particles of the fish and meat and it is desirable for the molasses to be added to this cooking kettle.

Moreover, in the preparation of sardine meal, for example, the fish may be cooked for a period of from 5 minutes to several hours at temperatures over 200° F. in order to reduce the fish to a homogeneous wet mass.

The cooked wet mass may thereupon be dehydrated either under reduced pressure or at atmospheric pressure by roller or drum drying, vacuum evaporation or by exposure to direct flame drying.

This invention is of particular importance in view of the fact that the resultant stabilized meat and fish meals may contain and generally do contain substantially large proportions of mineral matter which mineral matter is present in the form of disintegrated bone. The phosphate content of the bone apparently reacts with the blackstrap molasses and the phosphoprotein and glycerides present in the fish to produce the enhanced stabilizing effects at the temperature of over 200° F. and preferably above 220° F.

The most beneficial results of the present invention are not obtained in the absence of the higher proportion of phosphate or the phosphatide and protein or phosphoprotein. In addition, the fish or meat residue may be utilized even with a substantially high mineral content and even where the fish meal is subsequently prepared with metallic mineral constituents, such as manganese and copper salts, that normally tend to accelerate decomposition.

Among the various grades of molasses that may be utilized in accordance with the present invention are particularly included blackstrap molasses as obtained from the sugar cane, and less preferably, from beets. There may also be utilized refinery blackstrap molasses as well as sorghum molasses.

Not only is the rancidity and protein decomposition of the residue retarded, but loss of vitamin A is also retarded so that this process is of particular importance where applied to the manufacture of the high vitamin A containing fish residues.

This process will also render the meat and fish residues less subject to spontaneous combustion and their fire hazard will be very much lessened.

As much as 60% or 70% or more of blackstrap molasses is required against the total weight of the meat or fish solids.

The fish meal is dispersed in the molasses in order to stabilize the fish meal against loss of vitamin A and the development of rancidity as well as against reduction in biological value during subsequent storage. For example, fish meal such as herring meal may be dispersed in molasses on the basis of using 75% molasses and 25% herring meal. In such a dispersion, the molasses will occupy the continuous aqueous phase and the meal will be dispersed in the molasses as the discontinuous phase, each particle of the meal being surrounded by and intermingled with the molasses. This will produce an unusual stabilizing result and it is particularly desirable to use in this manner those fish meals that are particularly high in vitamin value as well as feed value.

Dehydrated fish livers are included with the fish meals and may also be incorporated with blackstrap molasses using a major proportion, preferably over 60%, of blackstrap molasses against the weight of the dehydrated livers and a stabilizing effect will be observed in retarding oxidation. Where the fish livers or meals are subjected to an elevated temperature such as to over about 200° F., after dispersing in the molasses, an enhanced stabilizing effect will be observed.

There may also be utilized in accordance with the present invention the highly active antioxygenic extracts removed from blackstrap molasses, and particularly by the use of an alcohol solvent. For example, backstrap molasses may be extracted by the use of methyl alcohol, ethyl alcohol, propyl alcohol and butyl alcohol and the extract thus obtained, after removal of the solvent therefrom, may be utilized in accordance with the present invention and has marked antioxygenic action. Preferably, the molasses is first dehydrated to substantial dryness before extraction in order to facilitate removal of the potent antioxygenic materials contained in the molasses.

It is particularly desirable to employ the molasses or molasses extracts or sugars in combination with phosphorous containing materials such as with lecithin, milk phospholipins, phosphatides, phosphoric acid, etc. For example, there may satisfactorily be employed in accordance with this invention a combination of molasses and lecithin, using, for example, 10 parts of molasses to 1 or more parts of lecithin. The phosphatide, particularly crude lecithin, when used in conjunction with the molasses materially increases the stabilizing power of the molasses. In addition, there may be employed, preferably in combination with the molasses, powdered or concentrated skim milk, buttermilk, whey and the water and alcoholic extracts of spice residues.

The molasses or sugars may be fortified with other products such as by mixing therewith a relatively small amount, generally less than 5%, and desirably under 1% of the aliphatic polycarboxylic acids such as tartaric, citric, lactic, or malic acid.

Other materials that may less desirably be used with the molasses or sugars are proteins such as casein, amino acids such as tyrosine or similar compounds such as asparagine, hydroxyaryl compounds such as hydroquinone, alpha-naphthol, pyrogallol, amino hydroxybenzenes and naphthalenes, etc. In all of these cases, the presence of the molasses or sugar is important in order to obtain the desired stabilizing action of the meat or fish residues.

In lieu of the molasses or other sugar material, it is also possible to include lecithin which may be added by itself or in combination with low molecular weight aliphatic polycarboxylic acids, proteins, amino acids, and low molecular weight hydroxyaryl compounds to the meat or fish product in aqueous condition and at the substantially elevated temperature. However, it is preferred to use molasses or combinations of molasses and phosphatides since they produce far better results than if lecithin were employed alone. In any event, the head treatment of substantially above 200° F. is necessary in order to produce the desired interaction.

It has been found particularly desirable to adjust the pH of the moisture containing meat and fish products in the cooking kettle or at the time of rendering or dehydration to between about 4 and 6.5 and preferably to a pH between about 5.5 to 6. Where this pH adjustment is made at the time the meat or fishery products are cooked, rendered or dehydrated, the resultant rendered oils and/or meals show an enhanced stabilizing condition. Where the molasses is added to the pH adjusted heating kettle, a particularly enhanced stabilization is obtained.

The present application is a continuation in part of application, Serial No. 260,898 filed March 10, 1939, which matured into Patent 2,198,211 issued April 23, 1940.

The claims of the present application are particularly directed to the subject matter which was divided out of said parent application, Serial No. 260,898 and particularly Examples III and V which appear on page 2 of Patent 2,198,211.

The present application is also a continuation in part of application, Serial No. 315,487, filed January 25, 1940, and which matured into Patent 2,198,209.

Through the above applications the present application continues the subject matter of applications, Serial No. 134,184 filed March 31, 1937, and Serial No. 135,169 filed April 5, 1937, which applications in turn continue the subject matter of application, Serial No. 257,099, filed February 18, 1939, now Patent 2,176,033.

Having described my invention, what I claim is:

1. A method of stabilizing the vitamin A and fatty and protein content of a meal selected from the group consisting of meat meal and fish meal against oxidative deterioration, which comprises dispersing the meal in finely divided form through a large body of molasses.

2. A method of stabilizing the vitamin A and fatty and protein content of fish meal against oxidative deterioration, which comprises dispersing the fish meal in finely divided form through a large body of blackstrap molasses.

3. A method of stabilizing the vitamin A and fatty and protein content of fish liver meals against oxidative deterioration, which comprises dispersing the fish liver meals in finely divided form through a large body of blackstrap molasses.

4. A method of stabilizing the vitamin A and fatty and protein content of a meal selected from the group consisting of meat meal and fish meal against oxidative deterioration, which comprises dispersing the meal in finely divided form through a large body of molasses, followed by heating to over 200° F. to obtain enhanced stabilization.

5. As a new composition of matter, an animal meal composition comprising a dispersion of finely divided animal meal selected from the group consisting of meat meal and fish meal in a large body of molasses, the vitamin A and fatty and protein content of said meal being substantially stabilized against oxidative deterioration.

6. As a new composition of matter, a fish meal composition comprising a dispersion of finely divided fish meal in a large body of blackstrap molasses, the vitamin A and fatty and protein content of said fish meal being substantially stabilized against oxidative deterioration.

7. As a new composition of matter, a fish liver meal composition comprising a dispersion of finely divided fish liver meal in a large body of blackstrap molasses, the vitamin A and fatty and protein content of said fish liver meal being substantially stabilized against oxidative deterioration.

SIDNEY MUSHER.